(12) United States Patent
Yuasa

(10) Patent No.: US 7,720,033 B2
(45) Date of Patent: May 18, 2010

(54) WIRELESS COMMUNICATION APPARATUS AND WIRELESS COMMUNICATION CONTROL METHOD FOR WIRELESS COMMUNICATION SYSTEM

(75) Inventor: Tomokazu Yuasa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 498 days.

(21) Appl. No.: 11/790,983

(22) Filed: Apr. 30, 2007

(65) Prior Publication Data

US 2007/0263582 A1    Nov. 15, 2007

(30) Foreign Application Priority Data

May 10, 2006   (JP) .............................. 2006-131775

(51) Int. Cl.
*H04B 7/208* (2006.01)
(52) U.S. Cl. ...................... 370/335; 370/344
(58) Field of Classification Search ............. None
See application file for complete search history.

(56) References Cited

U.S. PATENT DOCUMENTS 7,254,399 B2 *   8/2007   Salokannel et al. ...... 455/452.2

2003/0169697 A1   9/2003   Suzuki et al.
2004/0073674 A1   4/2004   Vergnaud et al.
2006/0188003 A1 * 8/2006   Larsson ...................... 375/130

FOREIGN PATENT DOCUMENTS

| JP | 2005-039728 | 2/2005 |
| JP | 2005-245040 | 9/2005 |
| JP | 2006-005547 | 1/2006 |
| JP | 2006-038669 | 2/2006 |

* cited by examiner

*Primary Examiner*—Erika A Gary
(74) *Attorney, Agent, or Firm*—Pillsbury Winthrop Shaw Pittman, LLP

(57) ABSTRACT

According to one embodiment, a wireless communication apparatus includes a reserved period ensuring unit which ensures a reserved period to be occupied for communication in a communicable period time-shared in a group by adjustment in a periodic beacon period, a wireless communication unit which performs wireless communication using the reserved period, a group generating unit which generates a new group in which a periodic beacon period is formed not to temporally overlap the beacon period and causes the apparatus to belong to the new group, when the reserved period ensuring unit fails to ensure the reserved period, and a controlling unit which controls the reserved period ensuring unit to ensure the reserved period not to temporally overlap the beacon period of the original group in the communicable period of the new group to which the apparatus is caused to belong by the group generating unit.

13 Claims, 8 Drawing Sheets

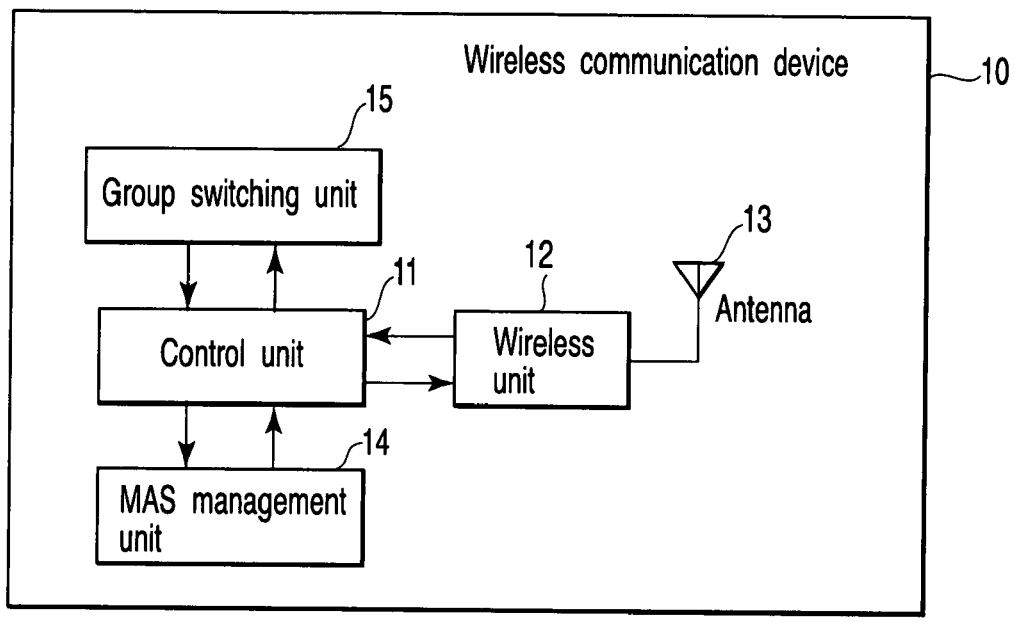
F I G. 1
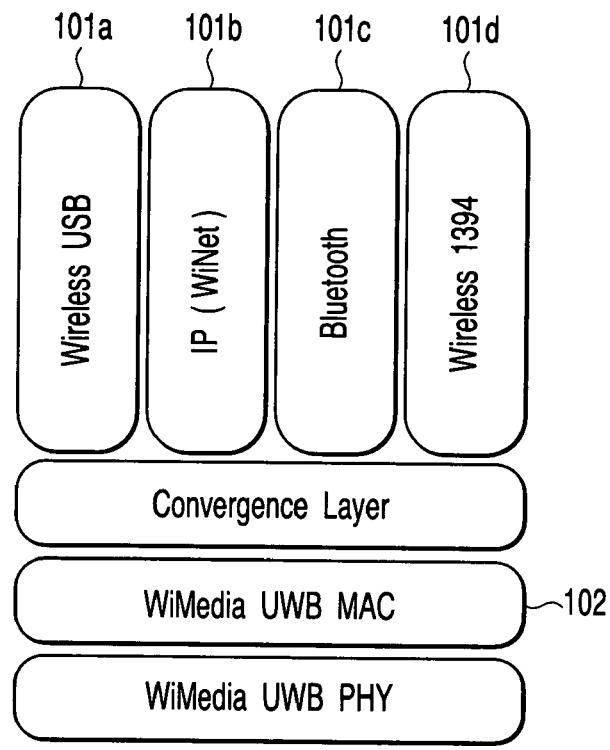
F I G. 2

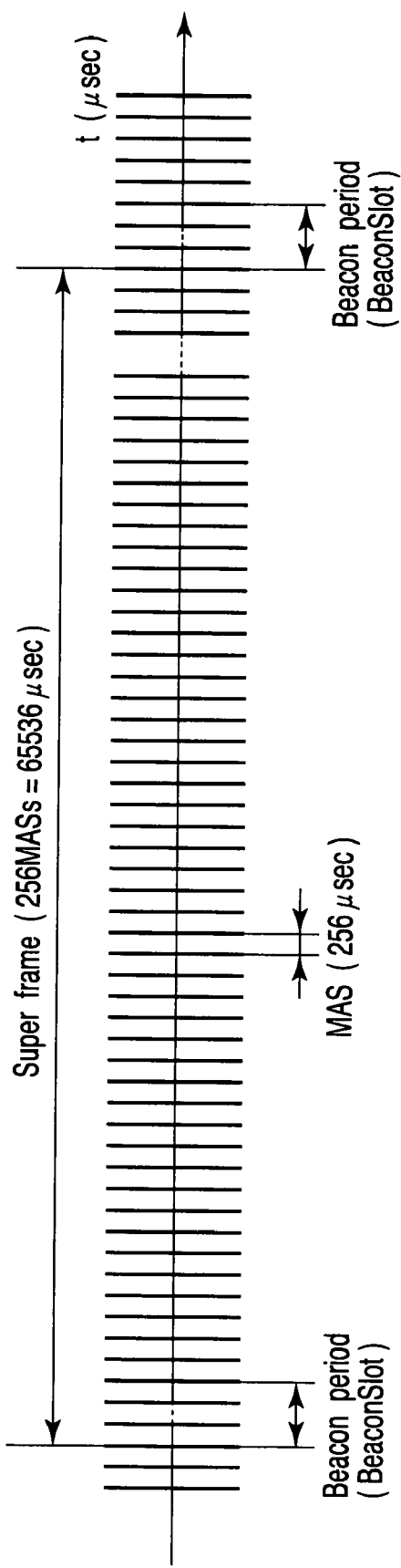
F I G. 3

| TFC Number | BAND ID | | | | | |
|---|---|---|---|---|---|---|
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 3 | 2 | 2 |
| 5 | 1 | 1 | 1 | 1 | 1 | 1 |
| 6 | 2 | 2 | 2 | 2 | 2 | 2 |
| 7 | 3 | 3 | 3 | 3 | 3 | 3 |
F I G. 7
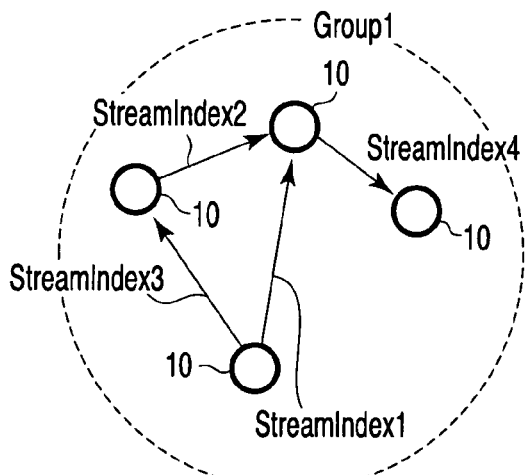
F I G. 8
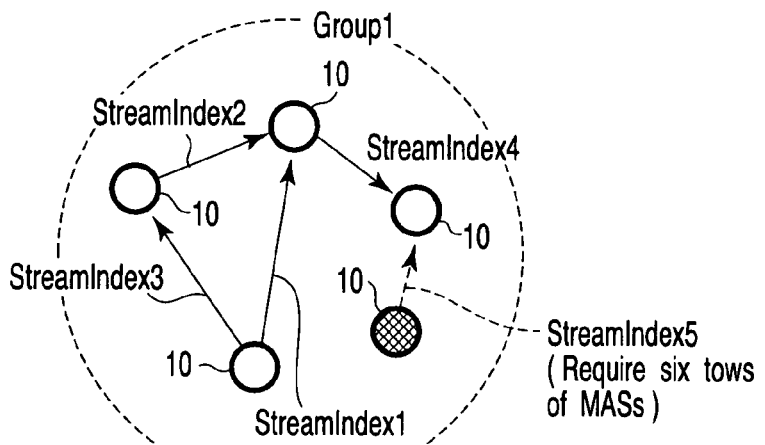
F I G. 9

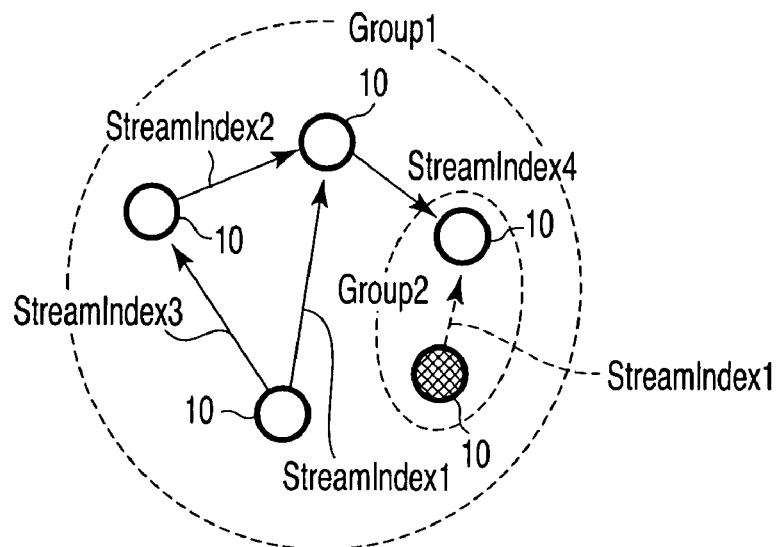
F I G. 10
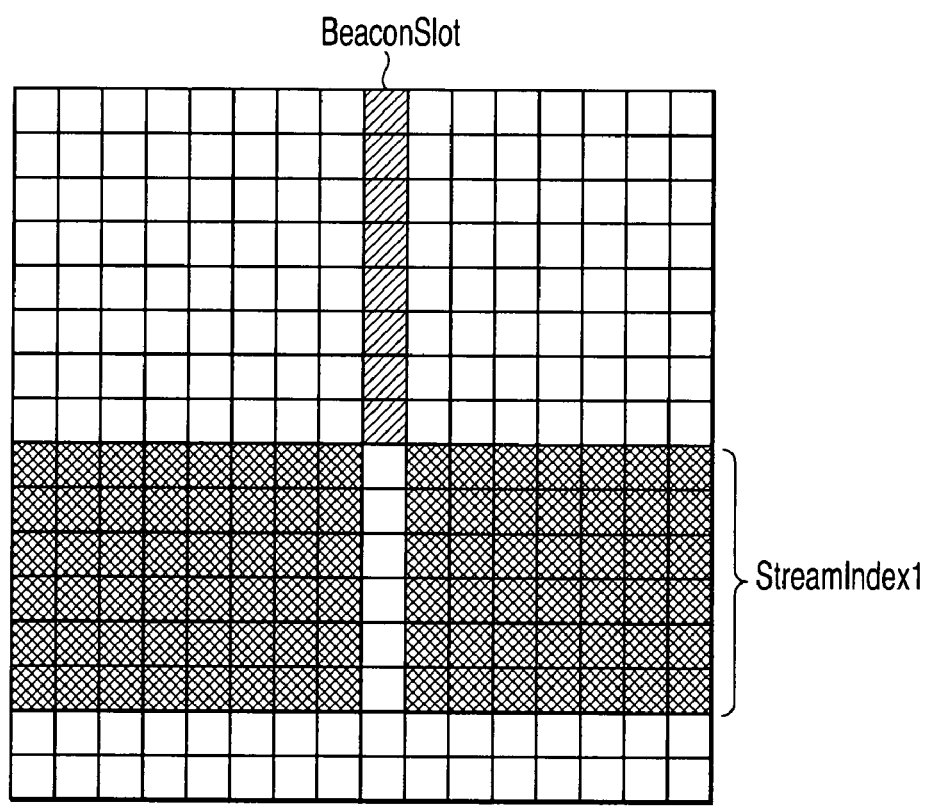
F I G. 11

WIRELESS COMMUNICATION APPARATUS AND WIRELESS COMMUNICATION CONTROL METHOD FOR WIRELESS COMMUNICATION SYSTEM

CROSS-REFERENCE TO RELATED APPLICATIONS

This application is based upon and claims the benefit of priority from Japanese Patent Application No. 2006-131775, filed May 10, 2006, the entire contents of which are incorporated herein by reference.

BACKGROUND

1. Field

One embodiment of the invention relates to a wireless communication control technique of efficiently performing wireless communication complying with, e.g., the UWB (Ultra WideBand) standard.

2. Description of the Related Art

Recently, many information processing apparatuses such as personal computers have wireless communication functions. For example, a LAN (Local Area Network) is often built in an office in order to share a resource. When communication can be performed without any cable, the layout of the office can easily change.

As a technique for wireless communication to be performed by this type of information processing apparatus, a technique of time-sharing a predetermined frequency band among a plurality of information processing apparatuses is available. In relation to this technique, various proposals have been made for the purpose of efficiently performing wireless communication using a given frequency band serving as a limited resource (for example, see Jpn. Pat. Appln. KOKAI Publication No. 2005 245040).

In a wireless communication system disclosed in Jpn. Pat. Appln. KOKAI Publication No. 2005 245040, a wireless communication apparatus (having the function of a wireless base station) which belongs to a given network (parent network) can build another network (child network) within the range of a resource allocated to the wireless communication apparatus itself. According to this proposal, since the parent and child networks do not interfere each other, a plurality of networks can coexist on the same frequency band.

Assume that a wireless communication apparatus A tries to start wireless communication with a wireless communication apparatus B on a given network. Also, assume that a resource must be additionally allocated to perform this wireless communication, but cannot be allocated to this network.

In the wireless communication system disclosed in Jpn. Pat. Appln. KOKAI Publication No. 2005 245040, when the wireless communication apparatus A can wirelessly communicate with the wireless communication apparatus B within the range of the resource allocated to the wireless communication apparatus A, or when the resource can be additionally allocated to the wireless communication apparatus A by its shortage, the wireless communication apparatus A can immediately start wireless communication with the wireless communication apparatus B. However, when the resource becomes short in the network in the existing wireless communication system such as the wireless communication system disclosed in Jpn. Pat. Appln. KOKAI Publication No. 2005 245040, the wireless communication apparatus A must wait until the shortage of the resource is supplemented.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram of a wireless communication apparatus according to an embodiment of the present invention;

FIG. 2 is an exemplary view showing the relationship among protocols in UWB (Ultra WideBand);

FIG. 3 is an exemplary view showing the structure of a super frame used in UWB;

FIG. 7 is an exemplary view showing arrangement of TFC numbers used in UWB;

FIG. 8 is an exemplary view showing that wireless communication is performed by MAS allocation shown in FIG. 5;

FIG. 9 is an exemplary view showing that wireless communication is tried to be started, from the state shown in FIG. 8, by using a resource larger than a usable resource;

FIG. 10 is an exemplary view showing MAS allocation management which consequently generates a new group in order to immediately start wireless communication from the state shown in FIG. 9;

FIG. 11 is an exemplary view showing an MAS allocation in the group newly generated by MAS allocation management shown in FIG. 10;

DETAILED DESCRIPTION

Figures 4, 5:
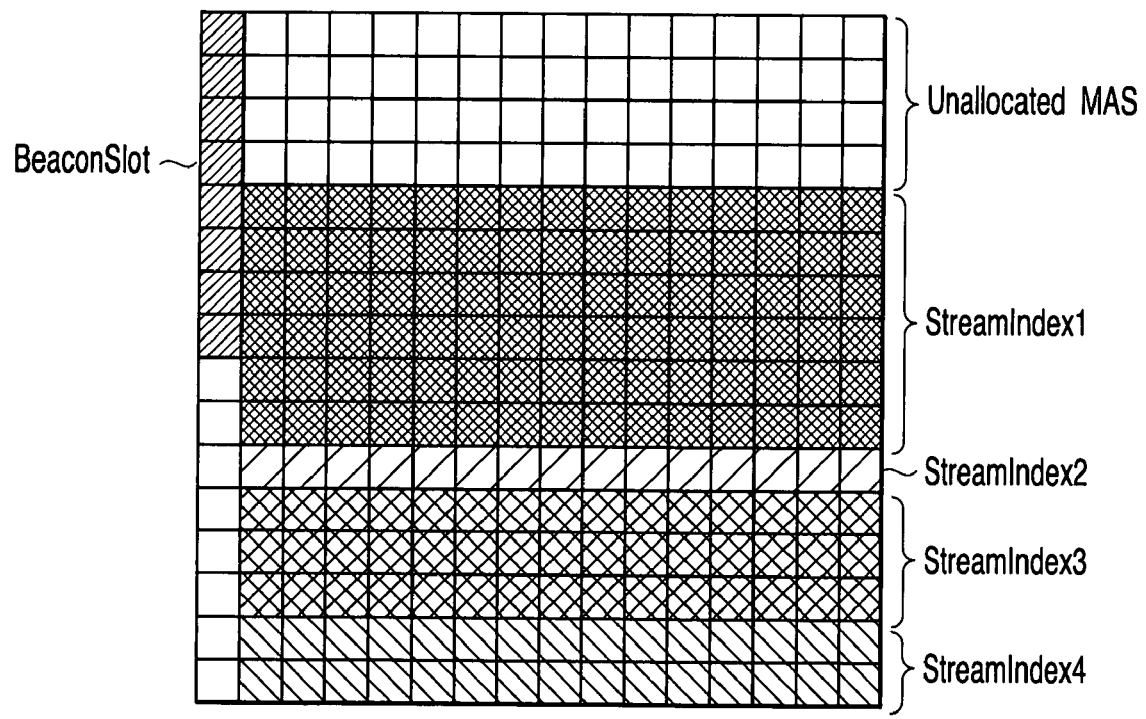
FIG. 4 is an exemplary conceptual view showing the super frame in FIG. 3 for each MAS.
FIG. 5 is an exemplary view showing an MAS allocation of the super frame using the conceptual view in FIG. 4.

Various embodiments according to the invention will be described hereinafter with reference to the accompanying drawings. In general, according to one embodiment of the invention, a wireless communication apparatus includes a reserved period ensuring unit configured to ensure a reserved period to be occupied for communication of the wireless communication apparatus in a communicable period time-shared in a group by adjustment in a periodic beacon period, a wireless communication unit configured to perform wireless communication using the reserved period ensured by the reserved period ensuring unit, a group generating unit configured to generate a new group in which a periodic beacon period is formed not to temporally overlap the beacon period and to cause the wireless communication apparatus to belong to the new group, when the reserved period ensuring unit fails to ensure the reserved period, and a controlling unit configured to control the reserved period ensuring unit to ensure the reserved period not to temporally overlap the beacon period of the original group in the communicable period of the new group to which the wireless communication apparatus is caused to belong by the group generating unit.

Assume that a wireless communication apparatus of the present invention serves as a UWB device which performs wireless communication complying with the UWB standard.

In UWB, each UWB device generates a group by using a shared frequency defined by a TFC (Time Frequency Code) number (channel hopping pattern), and belongs to the group to perform communication in the group. Communication is managed in the time unit, and each of all the UWB devices which participate in the group receives signals from the remaining UWB devices in a beacon period to grasp a current communication state. The communication state includes the correspondence between the UWB devices and the groups, and the ensuring state of reserved periods which are called MASs (Medium Access Slots) and occupied for communication between the UWB devices.

One super frame contains the 256 MASs time-shared among the UWB devices which belong to the group. If there is no free MAS when a given UWB device requests some MASs, and if the UWB device does not cope with the problem, the UWB device can neither ensure the MASs nor start communication. To cope with such problem, the UWB device according to this embodiment has a mechanism of immediately starting communication even in such situation. This point will be described below in detail.

FIG. 1 is an exemplary block diagram of a wireless communication apparatus 10 according to this embodiment. Referring to FIG. 1, the wireless communication apparatus 10 in this embodiment includes a control unit 11 which controls the operation of the apparatus 10 as a whole, a wireless unit 12 and antenna 13 which can be used in the UWB band, an MAS management unit 14 which manages a communication period used for communication of the apparatus 10, and a group switching unit 15 which switches the position of the apparatus 10 to a group which is newly generated by apparatus, include the apparatus 10, communicating with each other.

FIG. 2 is an exemplary view showing the relationship among protocols in UWB. Referring to FIG. 2, the UWB standard is a very efficient wireless communication technique which can be used in many applications such as a wireless USB 101a, IP (WiNet) 101b, Bluetooth® 101c, Wireless 1394 101d, and the like. In order to use the UWB system, first, each UWB device forms a group with a UWB device as a communication partner, and shares a communicable time resource defined by the UWB devices which belong to the group. A communicable time is allocated by a WiMedia UWB MAC 102 shown in FIG. 2.

FIG. 3 shows the structure of a super frame. Generally, a beacon period is set at the head of the super frame (65,536 µsec) such that all UWB devices in the group grasp the current state. A period from one beacon period to the next beacon period is the communicable time which can be shared among the UWB devices. The communicable time is managed for each MAS of 256 µsec (i.e., one super frame contains the 256 MASs).

FIG. 4 is an exemplary conceptual view showing the super frame for each MAS. Generally, the super frame is indicated in the two dimensional (2D) structure of 16 (vertical)×16 (horizontal). FIG. 5 shows a concrete example of MAS allocation. Each UWB device reserves the MASs for its own communication. Upon successively ensuring the required communication period (MASs), each UWB device adds a management number called a stream index to each period, thereby occupying the MASs in this period. Eight stream indexes can be allocated to one group at maximum. Basically, the MASs which have been already reserved by another UWB device cannot be used until the MASs are released.

Figure 6:
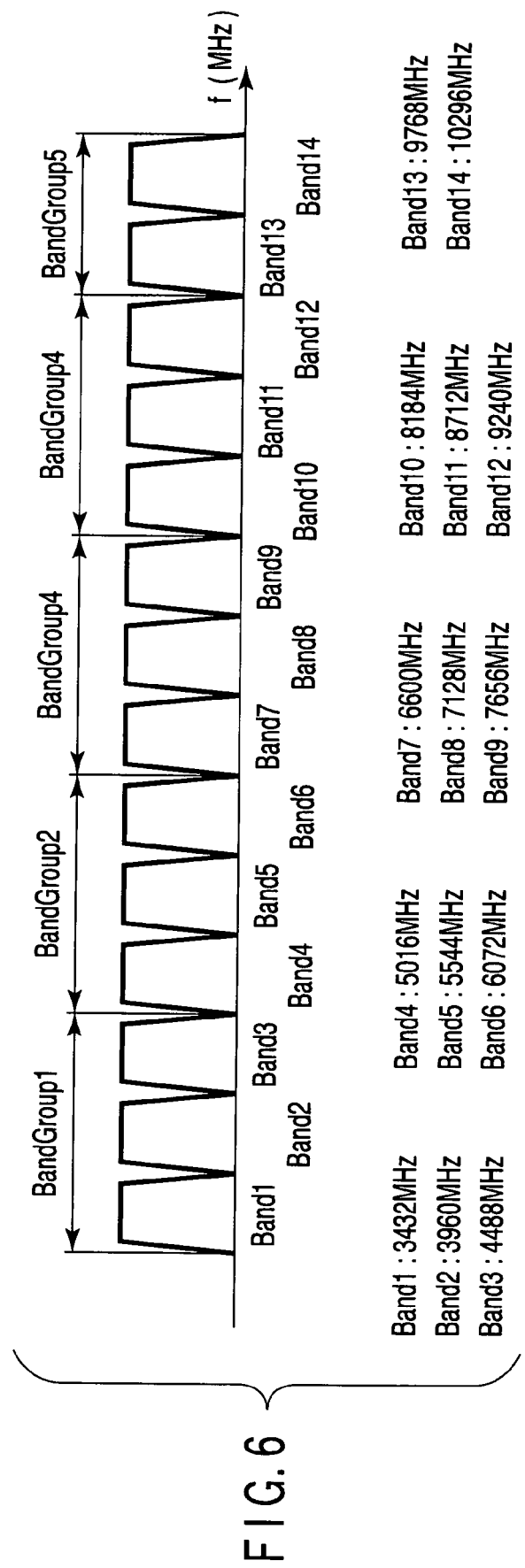
FIG. 6 is an exemplary view showing band group allocation used in UWB.

FIG. 6 shows band group allocation used in UWB. The frequency band used in UWB ranges from 3.1 GHz to 10.6 GHz, and divided into bands each having a frequency of 528 MHz. One group (except for BandGroup5) including the three bands is called as a band group, and communication is performed for each band group. Each group having the plurality of UWB devices selects one band group, and performs frequency hopping based on the TFC (Time Frequency Codes) number (to be described later) to perform communication. This frequency hopping avoids a communication collision to another group which selects the same band group.

FIG. 7 shows arrangement examples of the TFC numbers. For example, upon using a TFC number 1, the group which selects BandGroup1 performs frequency hopping in the order of band1, band2, band3, band1, . . . to perform communication. Referring to FIG. 7, band hopping patterns for communication differ from each other depending on the TFC numbers, thereby avoiding frequency interference with the remaining groups (which select the same band group).

FIG. 8 shows that wireless communication is performed by MAS allocation shown in FIG. 5. More specifically, four wireless communication apparatuses 10 are included in Group1, and perform wireless communication with each other using four stream indexes (StreamIndex1 to StreamIndex4). At this time, four rows of MASs are not allocated (are free) in Group1.

Referring to FIG. 9, assume that a given wireless communication apparatus 10 (hatched portion) tries to start wireless communication with a wireless communication apparatus 10 in Group1 by using additional six rows of MASs (StreamIndex5). That is, assume that the resource becomes short. In this case, conventionally, the new wireless communication apparatus 10 must wait until any of the remaining wireless communication apparatuses 10 releases the resource by its shortage or more. To cope with this problem, referring to FIG. 10, the wireless communication apparatus 10 according to this embodiment performs MAS allocation management and generates new Group2 such that wireless communication can immediately start even when the resource is short.

That is, when the six rows of MASs are newly required for StreamIndex5 at the time of detection that this request cannot be satisfied in the current MAS state based on the information obtained in the beacon period, the wireless communication apparatus 10 according to this embodiment negotiates with the wireless communication apparatus 10 to be a communication partner to participate in a new group, and generates new Group2 by using the TFC number different from that of existing Group1. With this operation, the usable MAS resource increases such that communication can immediately start by using the MAS resource of Group2 with reference to FIG. 11. Note that the beacon period of Group2 is set not to overlap that of Group1 to which the communication partner has originally belonged (see FIG. 5).

As long as an expected purpose can be achieved, negotiation can be applied to any methods such as a method of ensuring a minimum number of MASs in Group1 to communicate with the communication partner using the MASs, and a method of broadcasting, to all UWB devices including the desired partner in the group, a signal to request the desired partner to participate in the new group in the beacon period of Group1.

In this case, the wireless communication apparatus 10 as the communication partner also detects the beacon signal of Group1 to which it has originally belonged (for this purpose, the beacon period of Group2 is set not to overlap that of Group1). After communication in Group2 ends or during communication in Group2, the MASs for Group1 may be ensured, and communication may be continued. Group2 may be canceled or continued after communication ends. Of course, the remaining wireless communication apparatuses 10 can belong to Group2.

Figure 12:
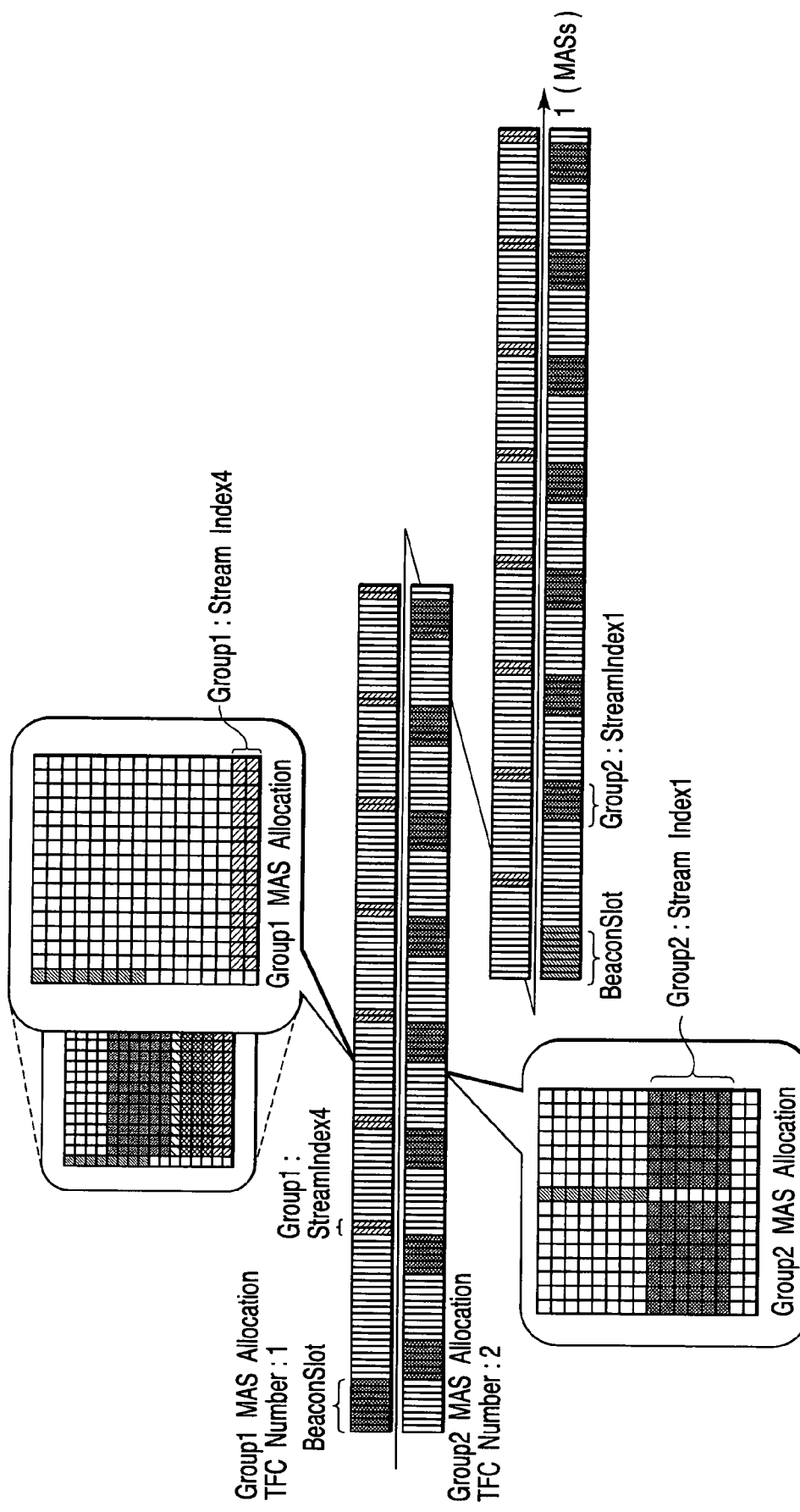
FIG. 12 is an exemplary view showing MAS allocation implemented by a wireless communication apparatus which belongs to two groups.

FIG. 12 shows MAS allocation of the wireless communication apparatus 10 which belongs to two groups. As described above, the beacon period of Group2 is set not to overlap that of Group1 to which it has originally belonged. Referring to FIG. 10, since the MAS resource is short to be allocated, new Group2 is generated. As a result, the wireless communication apparatus 10 which participates in two groups executes MAS allocation not to overlap between the beacon periods and reserved MASs of two groups.

If the reserved MASs of Group1 are not released, new MASs are reserved in the MASs of Group2 not to overlap the reserved MASs. With this operation, the wireless communication apparatus 10 can simultaneously participate in Group1 to which it has originally belonged and Group2 which is newly generated. The MAS management unit 14 executes these operations. Communication starts after the MASs are completely reserved without any overlapping. In this case, communication is performed in a reserved period of the appropriate group selected by the group switching unit 15. For example, the group switching unit 15 appropriately switches the group to which the wireless communication apparatus 10 belongs, such that the beacon period of Group2 and StreamIndex4 period belong to Group1, and the beacon period of Group2 and StreamIndex1 belong to Group2.

In this embodiment, the new group is generated by changing the TFC number from that of the original group. However, the new group may be generated by changing the band group. Since eight stream indexes can be managed for each group at maximum, the super frame may be occupied by eight stream indexes even if there are free MASs. However, communication can also start by generating a new group even when the resource is short in such situation.

Figure 13:
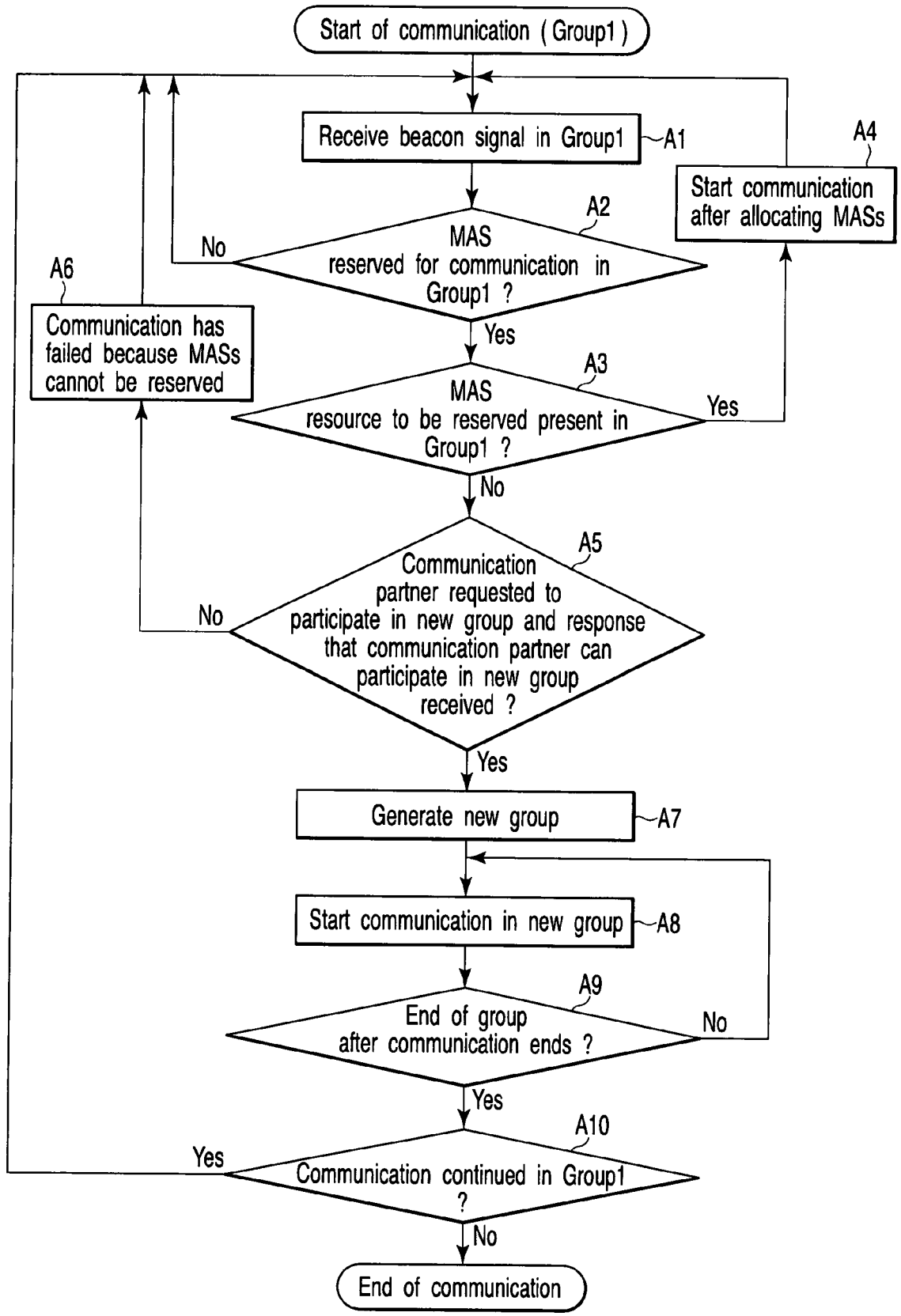
FIG. 13 is an exemplary flowchart showing a communication sequence of the wireless communication apparatus according to the embodiment.

FIG. 13 is an exemplary flowchart showing a communication sequence of the wireless communication apparatus 10 according to the embodiment. Assume that new communication starts in Group1.

When starting communication, in order to detect the remaining UWB devices and ensure communicable reserved period, the control unit 11 receives a beacon signal in Group1 (block A1). In order to perform communication in Group1, the control unit 11 causes the MAS management unit 14 to reserve a communication period which does not overlap that of each of the remaining UWB devices (YES in block A2).

If the MAS management unit 14 has successfully ensured the reserved period (YES in block A3), the control unit 11 directly starts communication in Group1 (block A4). If the reserved period cannot be ensured (NO in block A3), the control unit 11 requests the device to be a communication partner to participate in the new group, and inquires whether to participate in the new group (block A5).

If the communication partner cannot participate in the new group (NO in block A5), the MASs cannot be ensured since the group is not generated, thereby failing communication (block A6). In this case, communication is suspended until the required number of MASs is ensured by releasing the MASs of the remaining UWB devices. On the other hand, when the partner can participate in the new group (YES in block A5), the control unit 11 generates the new group (block A7), and causes the MAS management unit 14 to ensure the MAS resource in the new group to start communication (block A8).

After the communication ends, the control unit 11 may continuously use Group2 (NO in block A9), or release the MAS resource (YES in block A9). Since the beacon signal of Group1 to which the communication partner has originally belonged is always received, communication in Group1 can be always performed. Hence, communication in Group1 can start again (of course, communication may be continued in parallel) (YES in block A10). After the communication completely ends (NO in block A10), the process ends.

As described above, the wireless communication apparatus according to this embodiment implements resource management capable of efficiently performing wireless communication even when the resource is short.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A wireless communication apparatus comprising:
   a reserved period ensuring module configured to ensure a reserved period to be occupied for communication of the wireless communication apparatus in a communicable period time-shared in a group by adjustment in a periodic beacon period;
   a wireless communication module configured to perform wireless communication using the reserved period ensured by the reserved period ensuring module;
   a group generator configured to generate a new group in which a periodic beacon period is formed not to temporally overlap a beacon period of the original group and to cause the wireless communication apparatus to belong to the new group, when the reserved period ensuring module fails to ensure the reserved period; and
   a controller configured to control the reserved period ensuring module to ensure the reserved period not to temporally overlap the beacon period of the original group in the communicable period of the new group to which the wireless communication apparatus is caused to belong by the group generator.

2. The wireless communication apparatus according to claim 1, wherein
   the group generator generates the new group in which the periodic beacon period is formed not to temporally overlap the reserved period ensured for communication of the wireless communication apparatus and the reserved period ensured for communication of a communication partner in the communicable period of the original group, and
   the controller ensures the reserved period in the communicable period of the new group not to temporally overlap the reserved period ensured for communication of the wireless communication apparatus and the reserved period ensured for communication of the communication partner in the communicable period of the original group.

3. The wireless communication apparatus according to claim 2, wherein the group generator switches the group to which the wireless communication apparatus belongs such that the reserved period ensured for communication of the wireless communication apparatus in the beacon period and the communicable period of the original group belongs to the original group, and the reserved period ensured for communication of the wireless communication apparatus in the beacon period and the communicable period of the new group belongs to the new group.

4. The wireless communication apparatus according to claim 1, wherein
the wireless communication module performs wireless communication while performing hopping in a predetermined pattern in each unit time among a plurality of frequency bands allocated to the group to which the wireless communication apparatus belongs, and
the group generator generates a group, as the new group, in which hopping is performed in a pattern different from a pattern of the original group among the plurality of frequency bands allocated to the original group.

5. The wireless communication apparatus according to claim 1, wherein the group generator generates a group, as the new group, to which a frequency band different from a frequency band allocated to the original group is allocated.

6. The wireless communication apparatus according to claim 1, wherein the group generator ensures a minimum reserved period from a communicable period of the original group in the beacon period of the original group, and transmits a signal for requesting a communication partner to participate in the new group in the reserved period.

7. The wireless communication apparatus according to claim 1, wherein the group generator broadcasts a signal for requesting a communication partner to participate in the new group in the beacon period of the original group.

8. A wireless communication control method for a wireless communication system which includes a group comprising a plurality of wireless communication apparatuses, and time-shares a communicable period in a group by adjustment in a periodic beacon period, the method comprising:

generating a new group in which a periodic beacon period is formed not to temporally overlap a beacon period of the original group when the communicable period has no free period; and
ensuring a reserved period in the communicable period of the new group not to temporally overlap the beacon period of the original group.

9. The wireless communication control method according to claim 8, further comprising generating the new group in which the periodic beacon period is formed not to temporally overlap the reserved period ensured in the communicable period of the original group, and ensuring the reserved period in the communicable period of the new group not to temporally overlap the reserved period ensured in the communicable period of the original group.

10. The wireless communication control method according to claim 8, further comprising generating a group, as the new group, in which hopping is performed in a pattern different from a pattern of the original group among the plurality of frequency bands allocated to the original group.

11. The wireless communication control method according to claim 8, further comprising generating a group, as the new group, to which a frequency band different from a frequency band allocated to the original group is allocated.

12. The wireless communication control method according to claim 8, further comprising ensuring a minimum reserved period from a communicable period of the original group in the beacon period of the original group, and transmitting a signal for requesting a communication partner to participate in the new group in the reserved period.

13. The wireless communication control method according to claim 8, further comprising broadcasting a signal for requesting a communication partner to participate in the new group in the beacon period of the original group.

* * * * *